US005347855A

United States Patent [19]

Miyata et al.

[11] Patent Number: 5,347,855

[45] Date of Patent: Sep. 20, 1994

[54] MISFIRE DETECTOR DEVICE FOR USE IN AN INTERNAL COMBUSTION ENGINE

[75] Inventors: Shigeru Miyata; Yoshihiro Matsubara; Junichi Kagawa, all of Nagoya, Japan

[73] Assignee: NGK Spark Plug Co. Ltd., Nagoya, Japan

[21] Appl. No.: 29,235

[22] Filed: Mar. 10, 1993

[30] Foreign Application Priority Data

Mar. 11, 1992 [JP] Japan .................................. 4-052660
Mar. 25, 1992 [JP] Japan .................................. 4-066593

[51] Int. Cl.$^5$ .............................................. G01M 15/00
[52] U.S. Cl. ........................................ 73/116; 324/378
[58] Field of Search ............... 73/116, 118.1; 324/399, 324/459, 378

[56] References Cited

U.S. PATENT DOCUMENTS 2,296,033 1/1941 Heller .................................. 123/169
3,942,102 3/1976 Kuhn et al. ........................ 324/16 R
5,046,470 9/1991 Entenmann et al. ................ 123/481
5,230,240 7/1993 Oshawa et al. ....................... 73/116

FOREIGN PATENT DOCUMENTS 1603070 11/1981 United Kingdom .

*Primary Examiner*—Robert Raevis
*Attorney, Agent, or Firm*—Sughrue, Mion, Zinn, Macpeak & Seas

[57] ABSTRACT

In a misfire detector device for use in internal combustion engine, an electrical interrupter circuit on-off actuates a primary current flowing through a primary circuit of an ignition coil to induce a sparkplug voltage which is applied to a multi-electrode type spark plug. A check diode or a series gap is provided in a secondary circuit of the ignition coil so as to prevent a current flowing back to the ignition coil. A sparkplug voltage detector circuit detects an attenuation time length of a sparkplug voltage waveform presented subsequent to a predetermined time period after an end of a spark action of the spark plug. On the basis of the attenuation time length, a distinction circuit determines whether a misfire occurs in a cylinder of an internal combustion engine.

7 Claims, 19 Drawing Sheets upon running the engine at high revolution upon running the engine at low revolution upon running an engine
at low revolution upon running the engine
at high revolution
with high load

MISFIRE DETECTOR DEVICE FOR USE IN AN INTERNAL COMBUSTION ENGINE

BACKGROUND OF THE INVENTION

1. Field of the Invention

This invention relates to a misfire detector device for use in an internal combustion engine which is conceived on the finding that a sparkplug gap resistance is distinguishable the case in which a spark ignites an air-fuel mixture gas from the case in which the spark fails to ignite the air-fuel mixture gas injected in a cylinder of the internal combustion engine.

2. Description of Prior Art

With the demand of purifying emissions and enhancing fuel efficiency of internal combustion engines, it has been necessary to detect firing condition in each cylinder of the internal combustion engine so as to protect the internal combustion engine against any type of misfire. In order to detect the firing condition in each of the cylinders, an optical sensor has been installed within the cylinders. Further, a pressure-sensitive element has been attached to a seat pad of the spark plug, or the ion current due to an ignition circuit has been measured.

However, it is troublesome and time-consuming to install the optical sensor to each of the cylinders, thus increasing the installation cost, and at the same time, taking much time in carrying out periodic checks and maintenance. In addition, a high voltage withstanding diode is needed to introduce the ion current to a secondary circuit.

Therefore, it is an object of the invention to provide a misfire detector device for use in internal combustion engine which is capable of precisely detecting a misfire by checking a sparkplug voltage waveform applied to the spark plug installed to each cylinder of the internal combustion engine. A further object is to provide such a device-with a relatively simple structure, and which is easy to install and maintain.

SUMMARY OF THE INVENTION

According to the invention, there is provided a misfire detector device for use in an internal combustion engine.

In the misfire detector device, an ignition coil includes a primary coil and a secondary coil. An electrical interrupter circuit on-off actuates a primary current flowing through a primary circuit of the ignition coil to induce a sparkplug voltage. A series gap or a check diode is provided in a secondary circuit of the ignition coil so as to prevent a current flowing back to the ignition coil. A multi-electrode type spark plug is to be energized from the ignition coil. A voltage charging circuit re-energizes the primary coil to induce an electromotive voltage in the secondary coil so as to electrically charge a stray capacity inherent in the spark plug at a time predetermined after the end of the spark action of the spark plug. A voltage divider circuit detects a divided voltage of the sparkplug voltage applied across electrodes of the spark plug. A sparkplug voltage detector circuit detects an attenuation time period length of an attenuation characteristics of a sparkplug voltage waveform presented subsequent to a time period predetermined after an end of a spark action of the spark plug and a distinction circuit determines on the basis of the attenuation time period length of the attenuation characteristics whether or not the spark ignites an air-fuel mixture.

In the multi-electrode type spark plug, a front end of a center electrode is circumferentially coated by a precious metal-based layer, and a front end and its end surface of an outer electrode is also coated by the precious metal-based layer.

In the misfire detector device, the sparkplug voltage is induced at the time period predetermined after the end of the spark action. The level of the sparkplug voltage (4~5 kv) is controlled to be enough to break down the series gap such as, for example, a rotor gap of the distributor. The sparkplug voltage is applied to the multi-electrode type spark plug to electrically charge the stray capacity (10~20 pF) inherent in the spark plug. The attenuation characteristics of the charged voltage differs depending upon whether or not the density of the ionized particles in the combustion gas is high between the electrodes of the spark plug. Therefore, the misfire is detected by determining the attenuation characteristics of the sparkplug voltage waveform charged after the end of the spark action, and comparing the attenuation characteristics with data previously measured or calculated according to the running conditions.

When the ionized particles are present, the ionized particles are not evenly distributed in a combustion chamber of the internal combustion engine. Which direction the ion current is likely to flow depends upon how the combustion swirls develops. The intensity of the ion current is dominated by the outer surface area of the electrode. With the increase of its outer surface area, the ion current tends to flow smoothly. In order to make up for shortage of the ion current due to the development of the combustion swirls, the multi-electrode type spark plug is employed to make the ion current flow smoothly so as to precisely detect the misfire in the cylinder of the internal combustion engine.

In the misfire detector device which has the distributorless type igniter (DLI), the ignition coil is connected to each of the center electrodes of the multi-electrode type spark plug. The center electrode is in the side of either positive or negative polarity. When the center electrode is in the side of positive polarity, it is advantageous in precisely detecting the attenuation characteristics of the sparkplug voltage waveform. Although the center electrode is in the side of negative polarity, it is possible to facilitate the ion current flow by increasing the exposed area of the center electrode, thus insuring the same precision in detecting the attenuation characteristics as the case in which the center electrode is in the side of positive polarity.

According further to the invention, an ignition coil includes a primary coil and a secondary coil. An electrical interrupter circuit on-off actuates a primary current flowing through a primary circuit of the ignition coil to induce a sparkplug voltage. A check diode or series gap is provided in a secondary circuit of the ignition coil so as to prevent a current flowing back to the ignition coil. A multi-electrode type spark plug is to be energized from the ignition coil. A voltage divider circuit which detects a divided voltage of the sparkplug applied across electrode of the spark plug. A sparkplug voltage detector circuit detects an attenuation time period length of an attenuation characteristics of a sparkplug voltage waveform presented subsequent to a time period predetermined after an end of a spark action of the spark plug, and a distinction circuit determines on the basis of the attenuation time period length of the attenuation characteristics whether or not the spark ignites an air-fuel mixture.

According still further to the invention. An ignition coil includes a primary coil and a secondary coil. An interrupter circuit on-off actuates a primary current flowing through a primary circuit of the ignition coil to induce a spark plug voltage. A series gap or a check diode provided in a secondary circuit of the ignition coil. A multi-electrode type spark plug is to be energized from the ignition coil. A voltage charging circuit which induces a sparkplug voltage in the secondary circuit of the ignition coil so as to electrically charge a stray capacity inherent in the spark plug at a time predetermined after an end of a spark action of the spark plug when the engine runs at a low revolution with a low load. A voltage divider circuit detects a divided voltage of the sparkplug voltage applied across electrodes of the spark plug. A sparkplug voltage detector circuit detects an attenuation characteristics of a divided sparkplug voltage waveform presented subsequent to a time period predetermined after an end of the spark action when the engine runs at a high revolution, and detecting an attenuation characteristics of a divided sparkplug voltage waveform derived from the voltage charging circuit when the engine runs at a low revolution with a low load. A distinction circuit determines on the basis of the attenuation characteristics whether or not the spark ignites an air-fuel mixture.

In the misfire detector device, the multi-electrode type spark plug has a center electrode, a front end of which is circumferentially coated by a precious metal-based layer, and a front end and its end surface of an outer electrode is also coated by the precious metal-based layer. The precious metal-based layer protects a firing surface of the electrodes against spark-erosion caused from the oxidation evaporation.

In the misfire detector device in which the distributorless igniter is employed, an electrical energy stored the ignition circuit electrically charges the static capacity (10~20 pF) inherent in the spark plug immediately after the spark terminates. The charged voltage forms a sparkplug voltage of 5~8 kv when the internal combustion engine runs at a high revolution while forming a sparkplug voltage of 2~3 kv when the internal combustion engine runs at a low revolution. The sparkplug voltage is rapidly discharged through the electrodes of the spark plug after the termination of the spark when the spark normally ignites the air-fuel mixture gas, since the combustion gas staying between the electrodes is ionized. When the spark fails to ignite the air-fuel mixture gas, the sparkplug voltage is slowly released through the secondary circuit because the gas staying between the electrodes is free from ionized particles. The attenuation characteristics of the charged voltage depends on the density of the ionized particles of the combustion gas staying between the electrodes. When the ionized particles of the combustion gas are present between the electrodes, the attenuation characteristics hinges on the outer area of the electrodes, and the attenuation characteristics becomes short with the enlargement of the outer area of the electrodes because of the increased intensity of the ion current.

Therefore, whether or not misfire occurs in the cylinder of the internal combustion engine is determined by detecting an attenuation time length required for the sparkplug voltage to descend to a predetermined voltage level against the peak hold voltage after monitoring the sparkplug voltage between the check diode and the spark plug. In this instance, a descending ratio of the sparkplug voltage may be measured against a peak value of the peak hold voltage.

Whether or not a misfire occurs is determined by detecting the attenuation characteristics of the sparkplug voltage charged in the stray capacity after the end of the spark action, and comparing the characteristics with data previously measured or calculated according to the running conditions. In this instance, the ion current smoothly flows between the electrodes when the multi-electrode type spark plug is employed which has a plurality of electrodes, and having an enlarged outer surface area of the electroded exposed from the insulator. This enables to precisely detect the misfire by reducing the interruption of the ion current flow due to deviation of combustion swirls in a cylinder of the internal combustion engine.

In the misfire detector device in which a distributor is needed for an ignition device, there is provided a series gap (e.g. rotor gap) between the ignition circuit and the multi-electrode type spark plug so as to work as an air gap. This results in a relatively small electrical energy stored in the ignition circuit after the termination of the spark action when the engine runs at a low revolution. The small electrical energy often restricts to enhance the sparkplug voltage level so as to make it difficult to precisely determine the attenuation characteristics of the sparkplug voltage.

For this reason, the voltage charging circuit is provided to induce an enhanced level of the sparkplug voltage at a time predetermined after the end of the spark action only when the engine runs at a low revolution. The enhanced level of the sparkplug voltage is predetermined to be e.g. 5~7 kv which is high enough to break down the series gap of the distributor, but not enough to break down the spark gap, and thus electrically charging the stray capacity inherent in the spark plug. Discharging time length of the charged capacity changes depending on whether or not ionized particles are present in the combustion gas staying in the spark gap when the spark ignites the air-fuel mixture gas in the cylinder of the internal combustion engine.

The attenuation time length of the sparkplug voltage is detected after the spark is terminated in the same manner as previously mentioned to determine whether misfire occurs in the cylinder of an internal combustion engine.

Meanwhile, the sparkplug voltage often becomes excessively enhanced after the termination of the spark so that an electrical discharge occurs between the electrodes of the spark plug when the engine runs at a high revolution with a high load. In this instance, the secondary voltage rapidly descends irrespective of the misfire since the voltage charged in the stray capacity is released at once. This makes it difficult to distinguish the misfire from the normal combustion only by detecting the attenuation characteristics of the sparkplug voltage.

However, the enhanced voltage level of the sparkplug voltage is quite remarkable in distinguishing the misfire from the normal combustion after the end of the spark action when the engine runs at the high revolution with the high load. That is to say, the spark is likely to be sustained when the spark normally ignites the air-fuel mixture gas to ionize the particles in the combustion gas, so that the spark exhausts the electrical energy stored in the ignition circuit after the end of the spark action to enhance the sparkplug voltage only by 3~5 kv.

As opposed to the enhanced voltage 3∼5 kv, the enhanced sparkplug voltage exceeds 10 kv when the misfire occurs in the cylinder of the internal combustion engine.

Therefore, whether or not the misfire occurs is determined by detecting the enhanced level of the sparkplug voltage after the end of the spark action when the engine runs at the high revolution with the high load.

In the misfire detector device according to the invention, the exposed area of the center electrode has enlarged with the employment of the multi-electrode type spark plug, so that the ion current flow is facilitated to insure the precise misfire detection irrespective of the swirl stream variation in the cylinder of the internal combustion.

This also makes it possible to obviate the necessity of the optical sensor, the pressure-sensitive element and the high-voltage withstanding diode, thus enabling to provide a misfire detector device which is capable of precisely detecting the misfire in each cylinder of the internal combustion engine, and easy in mounting on the engine, superior in maintenance, simple in structure and readily reducible to practical use.

These and other objects and advantages of the invention will be apparent upon reference to the following specification, attendant claims and drawings.

BRIEF DESCRIPTION OF THE DRAWINGS

Referring to FIG. 1 which shows an ignition detector 100 which is incorporated into an internal combustion engine, the ignition detector 100 according to a first embodiment of the invention has an ignition circuit 1 which includes a primary circuit 11 and a secondary circuit 12 with a vehicular battery cell (V) as a power source. The primary circuit 11 has a primary coil (L1) electrically connected in series with a switching device 41 and a signal generator 42, while the secondary circuit 12 has a secondary coil (L2) connected to a rotor 2a of a distributor 2. The distributor 2 has stationary segments (Ra), the number of which corresponds to that of the cylinders of the internal combustion engine. To each of the stationary segments (Ra), is an free end of the rotor 2a adapted to approaches so as to make a rotor gap 21 (series gap) with the corresponding segments (Ra). Each of the segments (Ra) is connected to a multi-electrode type spark plug 3 by way of a sparkplug cable (H). The spark plug 3 has a center electrode 3a and an outer electrode 3b to form a spark gap 31 between the two electrodes 3a, 3b, across which spark occurs when energized. It is observed that a distributorless igniter in which no distributor is provided, may be used. In this instance, a one way diode or air gap may be employed instead of the rotor gap 21 of the distributor 2.

Figure 1:
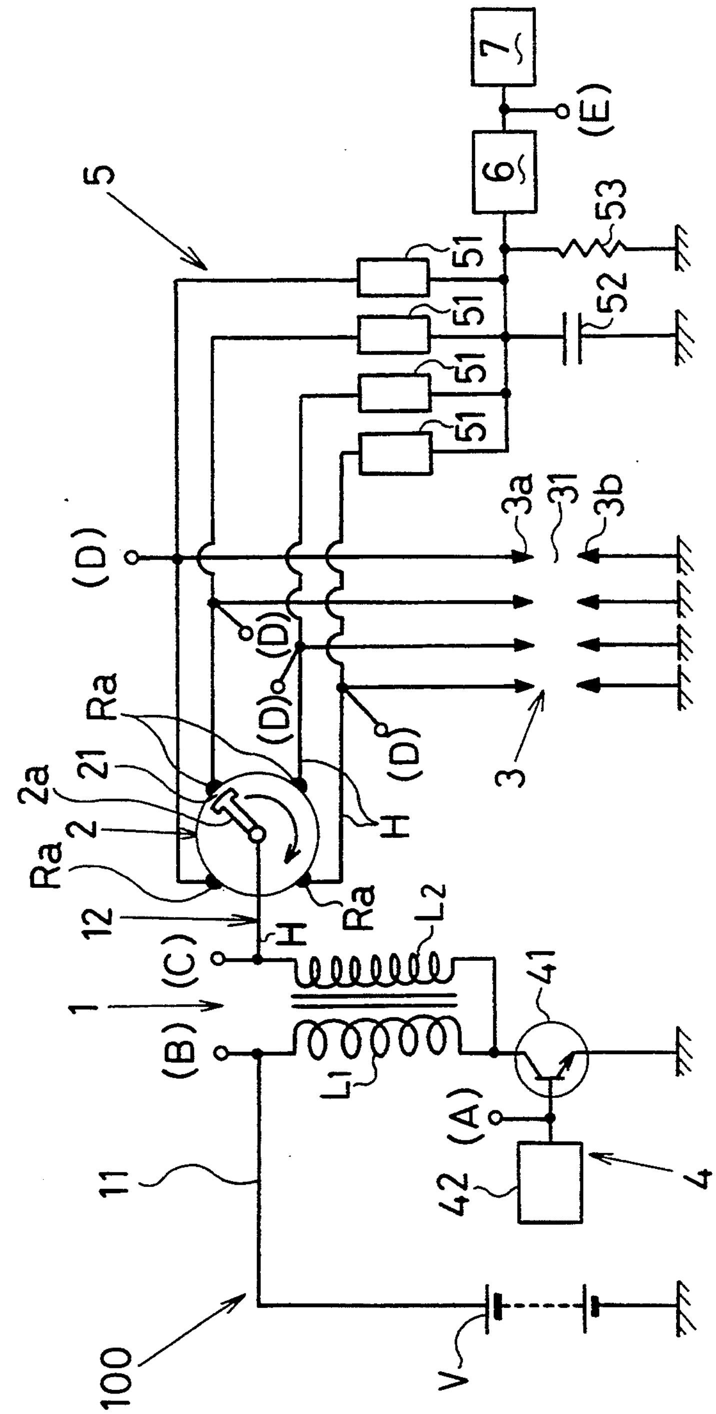
FIG. 1 is a schematic view of an ignition circuit in which an ignition detector is incorporated according to a first embodiment of the invention.

The switching device 41 and the signal generator 42 forms an interrupter circuit 4 which detects a crank angle and a throttling degree of the engine to interrupt primary current flowing through the primary coil (L1) to induce a sparkplug voltage in the secondary coil (L2) of the secondary circuit 12 so that the timing of the spark corresponds to an advancement angle relevant to a revolution and a load which the engine bears. The interrupter circuit 4 serves as a voltage charging circuit which on-off actuates the primary coil (L1) to induce a charging voltage in the secondary circuit 12 either during establishing the spark between the electrodes 3a, 3b or during a predetermined time period after an end of the spark, thus leading to electrically charging stray capacity inherent in the spark plug 3. In this instance, a discrete voltage charging circuit may be provided independently of the interrupter circuit 4.

Figure 2:
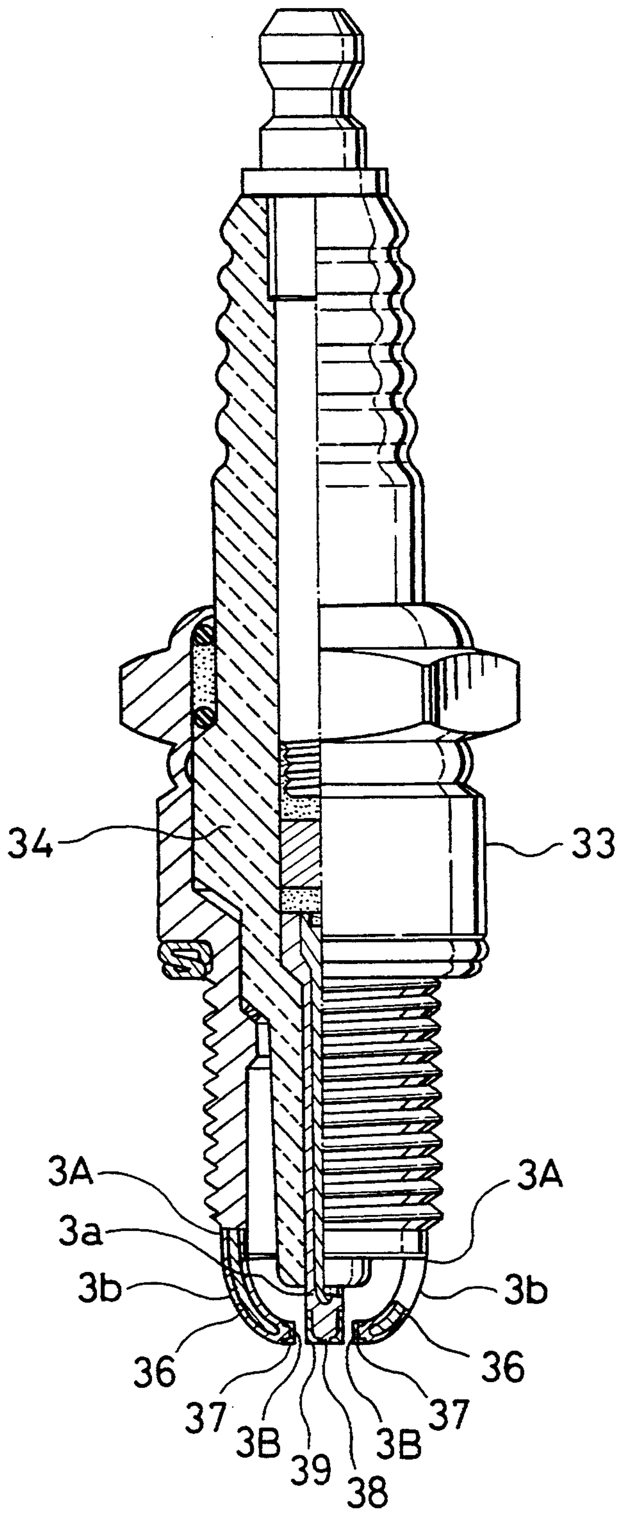
FIG. 2 is a plan view of a multi-electrode type spark plug, but its left half portion is longitudinally sectioned.
Figure 3:
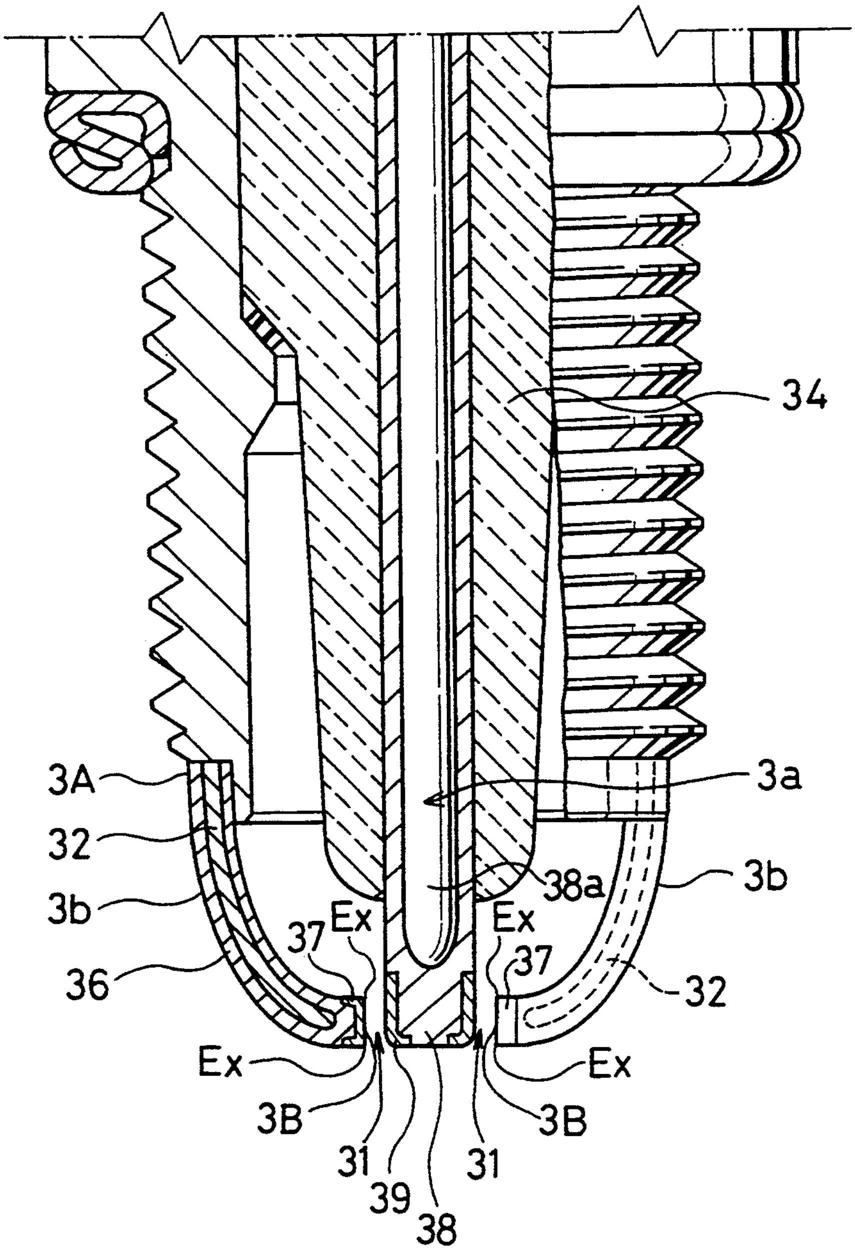
FIG. 3 is an enlarged longitudinal cross sectional view of a main part of the multi-electrode type spark plug.

As shown in FIGS. 2 and 3, the multi-electrode type spark plug 3 has a cylindrical metallic shell 33 to which the two outer electrodes 3b is welded at its base end 3A in diametrically opposing relationship. Within the metallic shell 33, is an tubular insulator 34 placed in which the center electrode 3a is inserted with its front end projected from the insulator 34. Each of the outer electrodes 3b has a front end surface 3B confronting a front end of the center electrode 3a to form a spark gap 31 therebetween. The outer electrode 3*b* has a clad 36 and a copper core 32 embedded in the clad 36. The clad 36 is a nickel-alloyed metal including 15.0 wt % Cr. The front end surface 3B of the outer electrode 3*b* and its front end are contiguously coated with a precious metal-based layer 37 which is made of a platinum-alloyed metal containing 20.0 wt % Ir or Ni. The layer 37 is 0.1~0.5 mm thick and 1.0~2.0 mm wide.

Meanwhile, the center electrode 3*a* has a columnar clad 38 and a heat-conductor core 38*a* embedded in the clad 38 as shown in FIG. 3. The clad 38 is made of a nickel-alloyed metal containing 20.0 wt % Cr, while the heat-conductor core 38*a* is preferably made of copper or silver-based alloy. A front end of the center electrode 3*a* is circumferentially coated with a precious metal-based layer 39.

With the front end surface 3B of the outer electrode 3*b* and its front end contiguously coated by the precious metal-based layer 37, the erosion-resistant layer 37 positively protects a cornered edge (Ex) against the spark erosion under the circumstances in which the outer electrode 3*b* has the cornered edge (Ex) which forms the spark discharge with the center electrode 3*a*, and is vulnerable to the spark erosion.

Meanwhile, an electrical conductor (sensor) 51 surrounds an extension part of the sparkplug cable (H) to define static capacity of e.g. 1 pF therebetween so as to form a voltage divider circuit 5. The conductor 51 is connected to the ground by way of a condensor 52. To a common point between the conductor 51 and the condensor 52, is a sparkplug voltage detector circuit 6 electrically connected to which a distinction circuit 7 is connected. The condensor 52 has a static capacity of e.g. 3000 pF to serve as a low impedance element, and the condensor 52 further has an electrical resistor 53 (e.g. 2MΩ) connected in parallel therewith so as to form a discharge path for the condensor 52.

Figure 4:
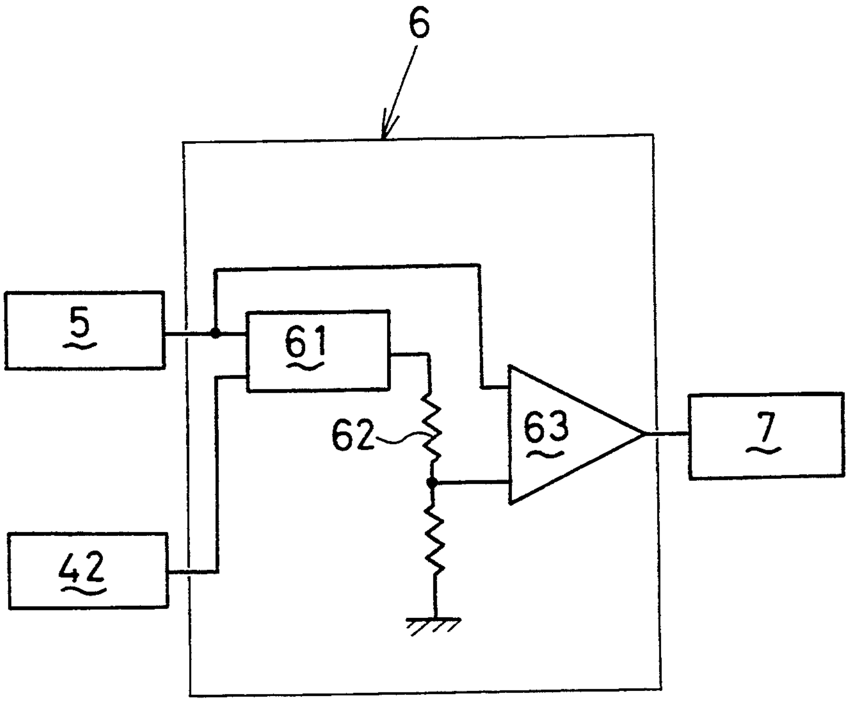
FIG. 4 is a view of a wiring diagram of a sparkplug voltage detector circuit.

The voltage divider circuit 5 allows to divide the sparkplug voltage induced from the secondary circuit 12 by the order of 1/3000, which makes it possible to determine the time constant of RC path to be approximately 9 milliseconds to render an attenuation time length of the sparkplug voltage relatively longer (3 milliseconds) as described hereinafter. In this instance, the sparkplug voltage 30000 V divided to the level of 10 V is inputted to the sparkplug voltage detector circuit 6. The sparkplug voltage detector circuit 6 has a peak hold circuit 61, a voltage divider circuit 62 and a comparator 63 as shown in FIG. 4. To the peak hold circuit 61, are the input signal (A) of the signal generator 42 and the divided voltage of the voltage divider circuit 5 inputted. The voltage divider circuit 62 divides an output voltage from the peak hold circuit 61. The comparator 63 compares the output from the voltage divider circuit 5 with the divided voltage from the voltage divider circuit 62 in order to detect a holding time length exceeding a reference level v (e.g. one-third of the peak hold value) predetermined by the voltage divider circuit 62 so as to generate an output pulse which is fed to the distinction circuit 7. The distinction circuit 7 determines whether or not the misfire occurs in the cylinder by detecting the holding time length exceeding the holding time length (width of the output pulse).

Figure 5:
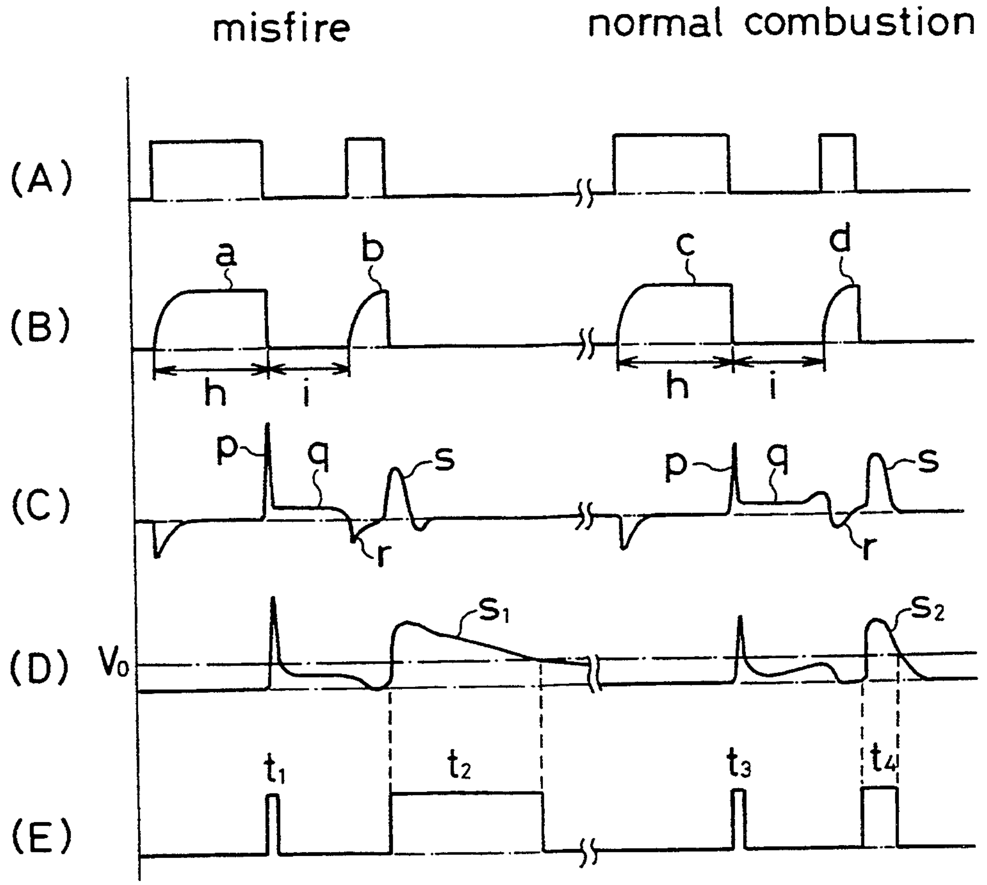
FIG. 5 is a view of a sparkplug voltage waveform shown for the purpose of explaining how the sparkplug voltage detector circuit works.

With the structure thus far described, the signal generator 42 of the interrupter circuit 4 outputs pulse signals as shown at (A) in FIG. 5 in order to induce the primary current in the primary circuit 11 as shown at (B) in FIG. 5. Among the pulse signals, the pulses (a), (c) which have a larger width (h) energizes the spark plug 3 to establish the spark between the electrodes 3*a*, 3*b*. The pulses (a), (c) followed by the pulses (b), (d) delays by the time of 0.5~1.5 ms (i). The pulses (b), (d) have a thin width to electrically charge the stray capacity inherent in the spark plug 3.

In so doing, the time length during which the free end of the rotor 2*a* forms the rotor gap 21 with each of the segments (Ra), changes depending on the revolution of the engine. The pulse width (h) and the delay time (i) are determined shorter in a manner that the spark holds for 0.5~0.7 ms when the engine is operating at high revolution (6000 rpm).

With the actuation of the interruter circuit 4, the sparkplug voltage appears in the secondary coil (L2) of the secondary circuit 12 as shown at (C) in FIG. 5. Due to the high voltage (p) established following the termination of the pulse signals (a), (c), the spark begins to occur with an inductive discharge waveform (q) accompanied.

In response to the rise-up pulse signals (b), (d), a counter-electromotive voltage accompanies a positive voltage waveform (r) flowing through the secondary circuit 12, thus making it possible to terminate the spark when the spark lingers. Due to an electrical energy stored in the ignition circuit 1 when the primary coil (L1) is energized, the secondary voltage is enhanced again to flow a voltage waveform (s) through the secondary circuit when the primary coil (L1) is deenergized. The enhanced voltage level is determined as desired by the delay time (i) and the width of the pulse signals (b), (d). The level of the voltage waveform (s) is 5~7 kv, the magnitude of which is enough to break down the rotor gap 21, but not enough to establish a discharge between the electrodes 3*a*, 3*b* when the air-fuel mixture gas staying in the spark gap 31 is free from ionized particles.

The discharge voltage in main from the stray capacity (usually 10~20 pF) inherent in the spark plug 3, is released as shown at (D) in FIG. 5. The attenuation time length of the discharge voltage is distinguishable from the case in which the spark normally ignites the air-fuel mixture gas to the case in which the spark fails to ignite the air-fuel mixture gas injected in each cylinder of the internal combustion engine. That is to say, the misfire follows a slowly attenuating waveform (s1) as shown in FIG. 5, while the normal combustion follows an abruptly attenuating waveform (s2) as shown in FIG. 5. The sparkplug voltage detector circuit 6 detects a voltage waveform level exceeding a reference voltage level (Vo) so as to deform the voltage waveform into square wave pulses t1~t4, each width of which is equivalent to the attenuation time length. The square wave pulses t1~t4 are inputted to the distinction circuit 7 so as to cause the circuit 7 to determine the misfire when the attenuation time length exceeds 3 ms (1 ms) with the revolution of the engine as 1000 rpm (6000 rpm). The distinction circuit 7 further determines the misfire when the attenuation time length exceeds the one decreasing in proportion to the engine revolution which falls between 1000 and 6000 rpm.

In the first embodiment of the invention, the rotor gap 21 of the distributor 2 is used as a series gap. In the distributorless ignitor, a check diode is provided in the secondary circuit to acts as the series gap. When a discrete voltage charging circuit is employed, a step-up coil may be used instead of the ignition coil 1 to induce a voltage (4~5 kv) so as to energize the secondary circuit 12.

When the exposed area of the center electrode 3*a* of the multi-electrode type spark plug 3 is small, it is preferable that the sparkplug voltage is maintained positive by reversely connecting the ignition circuit 1 since the ionized particles in the combustion gas allows the electric current to flow better when the step-up coil is kept positive than otherwisely connected. When the center electrode 3*a* is maintained positive polarity, the anode ions are attracted to the outer electrode 3*b* so that the exchange speed of the ions is facilitated by the outer surface area ratio of the outer electrode 3*b* to the center electrode 3*a*. The exchange speed of the ions is dominated by the speed of the cathode ions because the light weight electrons quickly moves toward the center electrode 3*a*.

In the cases in which the center electrode 3*a* is kept negative, and the exposed outer surface area of the center electrode 3*a* is great (preferably exceeding 25 $mm^2$), the cathode ions in the combustion flame are predominantly attracted to the center electrode 3*a* to positively permit a current flow, thus clearly observing the attenuation characteristics of the sparkplug voltage waveform.

In the misfire detector device which has the distributorless igniter (DLI), the ignition coil is connected to each of the center electrodes of the multi-electrode type spark plug. The center electrode is in the side of either positive or negative polarity. When the center electrode is in the side of positive polarity, it is advantageous in precisely detecting the attenuation characteristics of the sparkplug voltage waveform. Although the center electrode is in the side of negative polarity, it is possible to facilitate the ion current flow by increasing the exposed area of the center electrode, thus insuring the same precision in detecting the attenuation characteristics as the case in which the center electrode is in the side of positive polarity.

Figure 6:
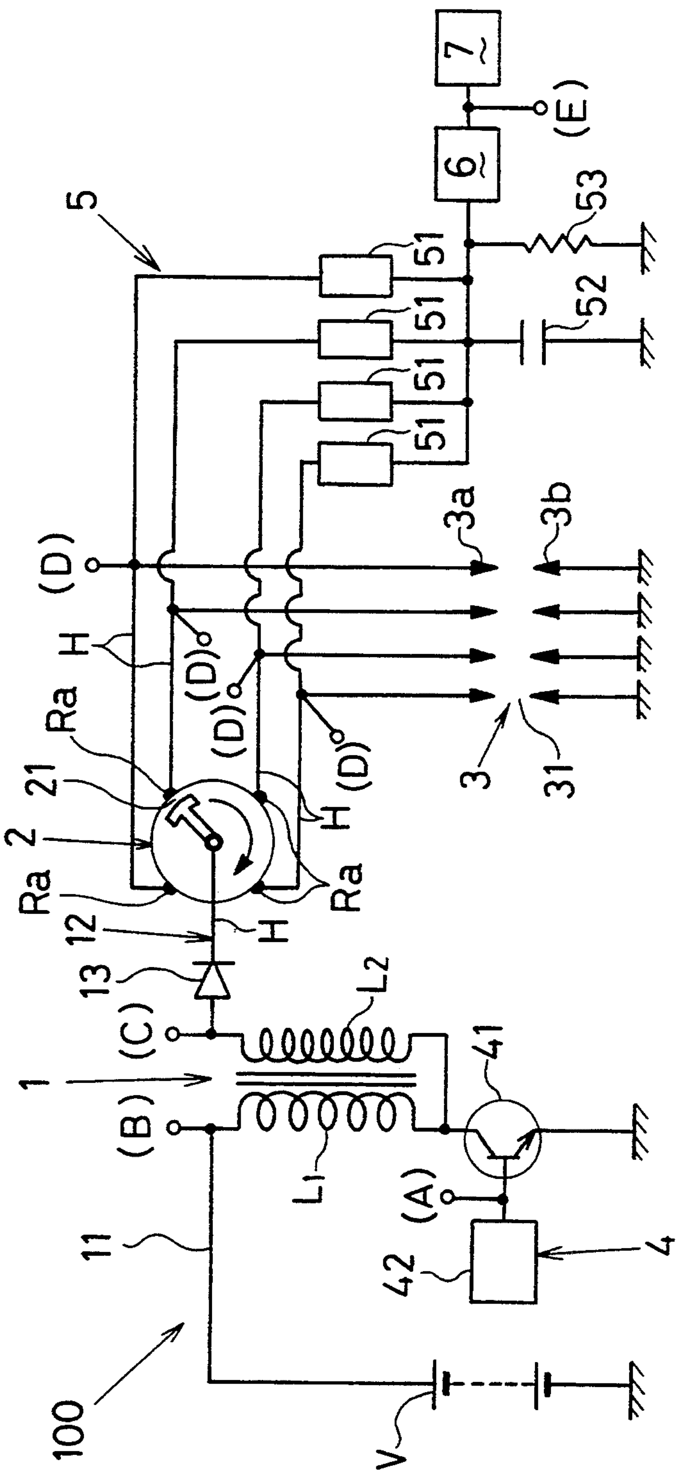
FIG. 6 is a view similar to FIG. 1 according to a second embodiment of the invention.
Figure 7:
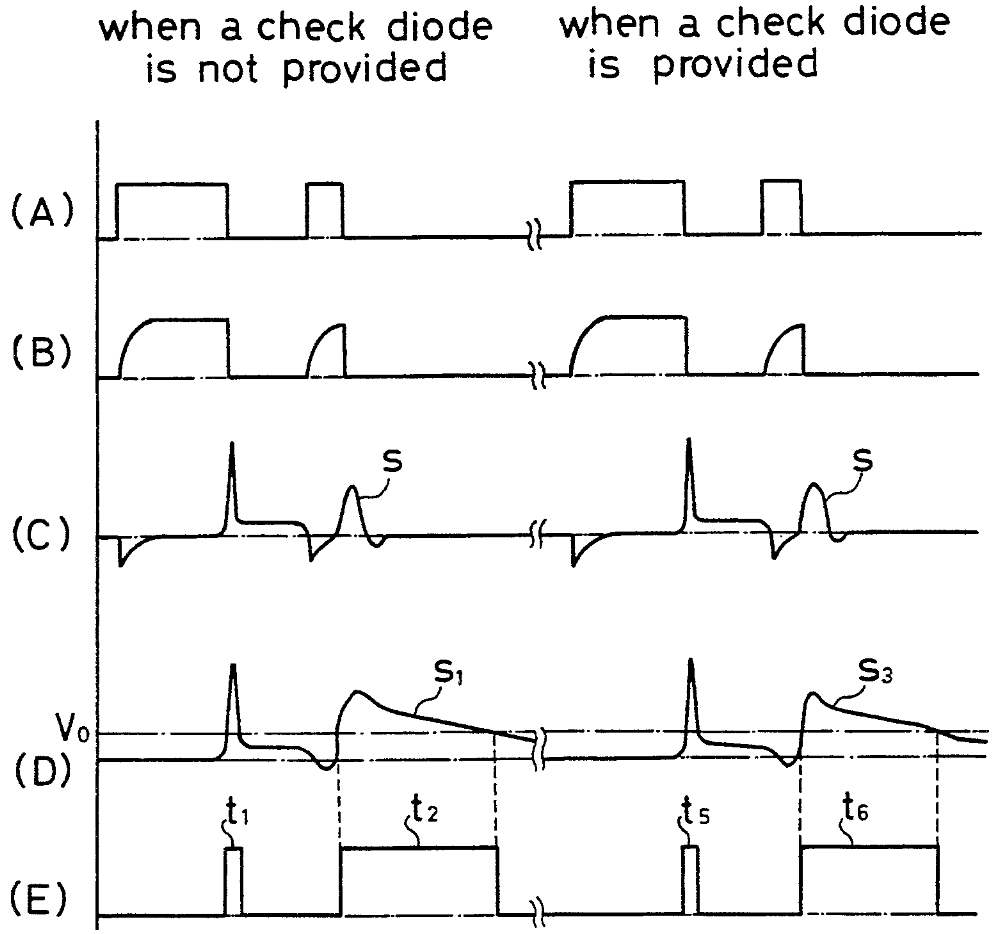
FIG. 7 is a schematic view of a sparkplug voltage detector circuit according to the second embodiment of the invention.

FIGS. 6 and 7 show a second embodiment of the invention in which a check diode 13 is electrically connected between the rotor gap 21 of the distributor 2 and the secondary coil (L2) of the secondary circuit 12. The diode 13 allows electric current to flow from the secondary coil (L2) to the rotor gap 21 of the distributor 2, but prohibits the electric current to flow backward.

With the pulse signals (A) which causes to induce the sparkplug voltage in the secondary circuit 21, the sparkplug voltage is enhanced again as mentioned hereinbefore when deenergized. The enhanced voltage electrically charges the stray capacity inherent in the spark plug 3 to make a potential difference between the ignition circuit 1 and the spark plug 3.

In this instance, the check diode 13 prohibits the electric current to flow through the rotor gap 21 in the direction opposite to the spark which occurs from the center electrode 3*a* to the outer electrode 3*b*. Otherwise, the voltage waveform (s) shown in FIG. 7 reduces from 5~7 kv to 3~4 kv so as to deteriorate the precision on detecting the attenuation time length.

With the provision of the check diode 13, the sparkplug voltage accompanies a slowly attenuating the voltage waveform (s3) as opposed to that accompanying the rapidly changing voltage waveform (s1) as shown in FIG. 7.

In the sparkplug voltage detector circuit 6, the peak hold circuit 61 holds a peak voltage based on the stray capacity of the spark plug 3 with ⅓ of the peak voltage as the reference voltage (V) for example. The comparator 63 compares the reference voltage (V) with the output voltage waveform from the voltage divider circuit 5 so as to output square pulses t5, t6 as shown at (E) in FIG. 7. The square pulses t5, t6 are inputted to the distinction circuit 7 to determine whether the misfire occurs or not in the cylinder of the internal combustion engine.

Figure 8:
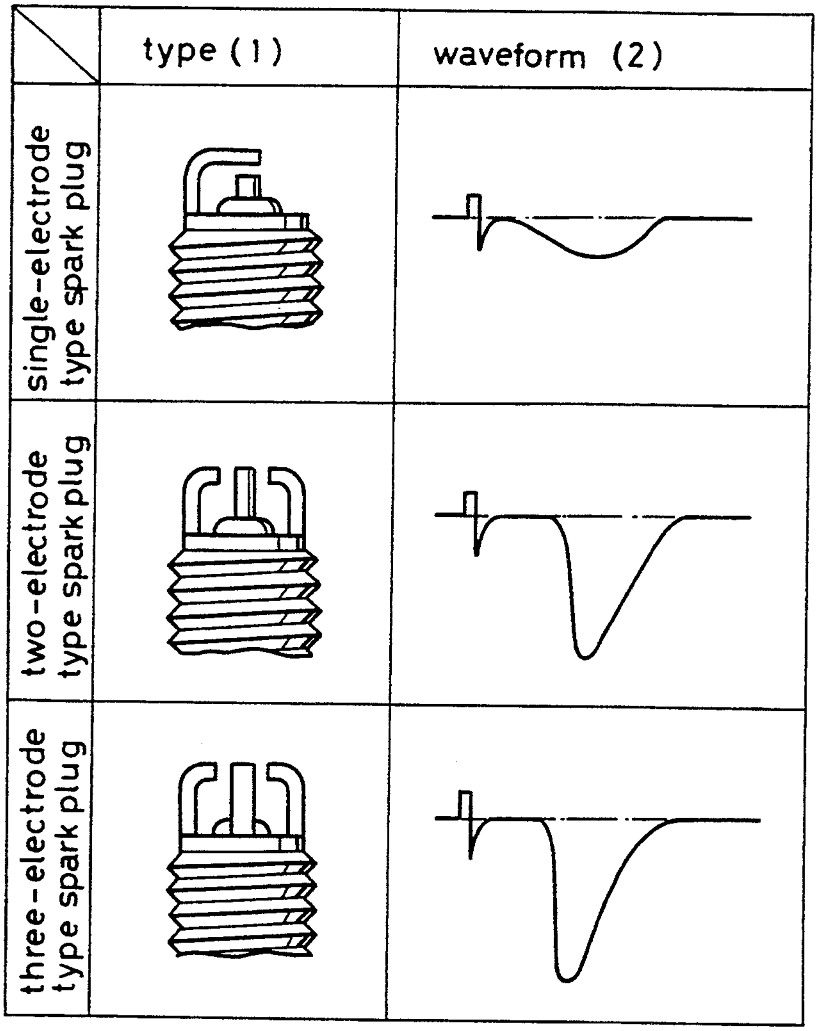
FIG. 8 is a graph showing a relationship between number of the electrodes of the spark plug and an ion current waveform.

FIG. 8 shows a relationship between the number (n) of outer electrodes of the multi-electrode type spark plug (1) and the ion current waveform (2) derived immediately after the end of the spark action. The relationship is obtained by carrying out the experiment test with each of the spark plug mounted on 2000 cc, four-cylinder and four-cycle engine. The results teach that the ion current increases with the increased number of the electrodes and thus distinguishing the noise to clarify the peak of the voltage waveform so as to readily detect the ion current.

Figure 9:
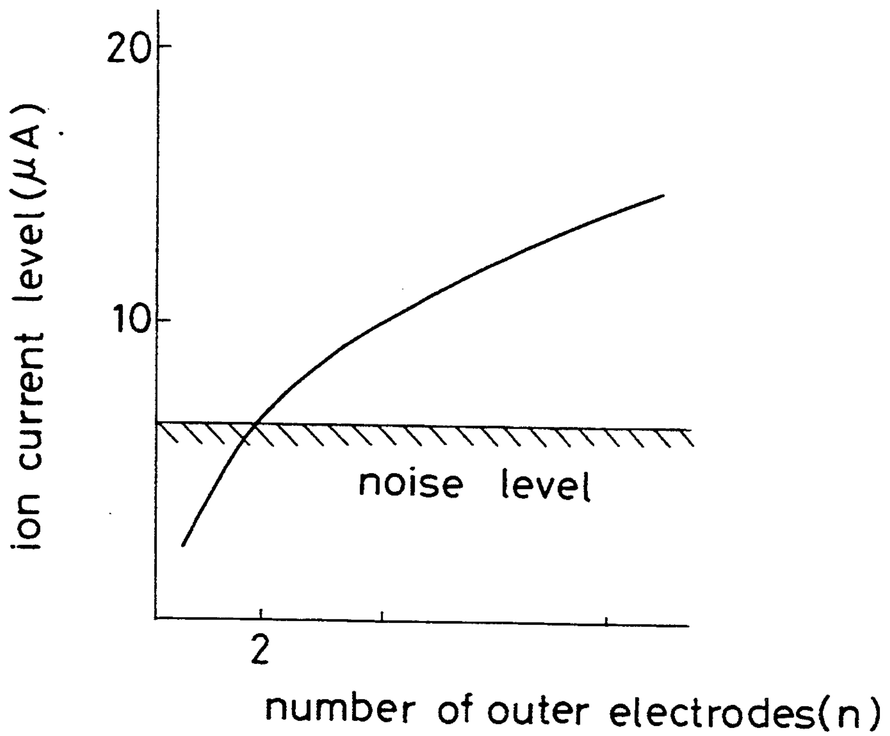
FIG. 9 is a graph showing a relationship between the number of the electrodes of the spark plug and an ion current level.

FIG. 9 shows a relationship between the number (n) of the outer electrodes 3*b* of the multi-electrode type spark plug 3 and a mean peak level of the ion current derived immediately after the end of the spark action. When the number (n) of the outer electrodes is more than two, the intensity of the ion current exceeds 8 μA. Considering that the noise level of the ion current detecting circuit is several μA, the ion current is precisely detected when the number (n) of the outer electrodes of the multi-electrode type spark plug 3 exceeds two.

Figure 10:
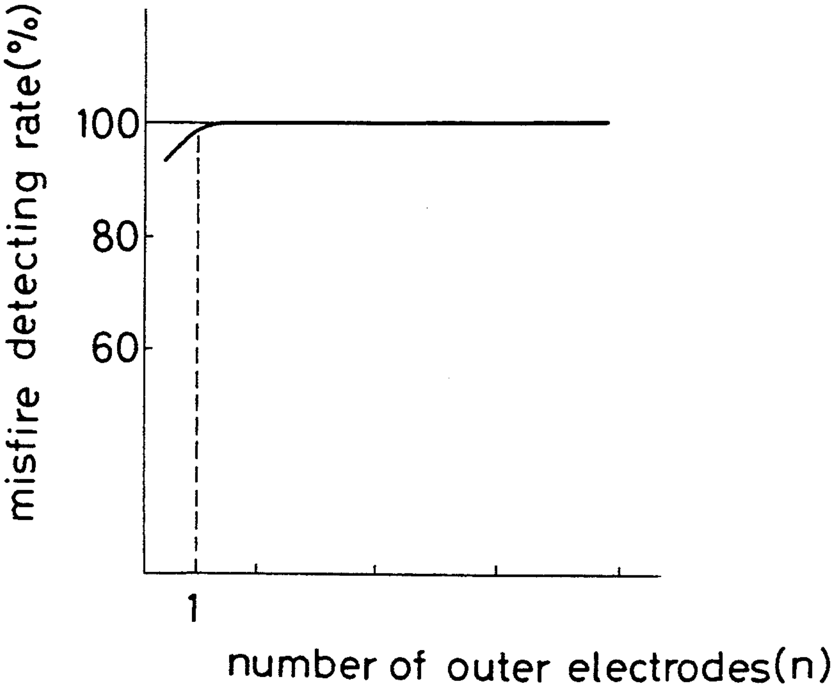
FIG. 10 is a graph showing a relationship between the number of the electrodes of the spark plug and a misfire detecting rate.

FIG. 10 shows a relationship between the number (n) of the outer electrodes 3*b* of the multi-electrode type spark plug 3 and a misfire detecting rate (%). In this instance, the misfire detecting rate is represented in term of the ion current level derived immediately after the end of the spark action. The results indicate that when a single-electrode type spark plug used, the peak level of the ion current is too low to distinguish the noise so that the misfire detecting rate quickly deteriorates.

Figure 11:
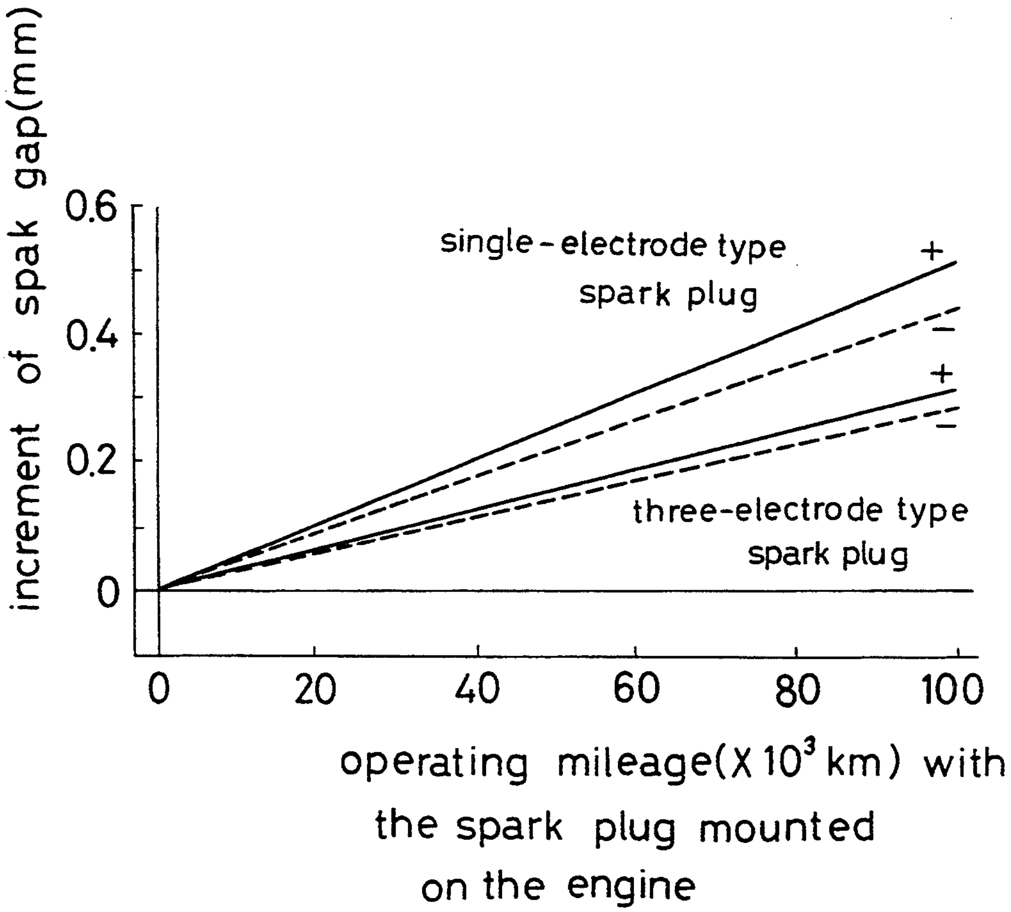
FIG. 11 is a graph showing a relationship how a spark gap increases with the operating mileage depending on the number of the electrodes.

FIG. 11 shows a relationship how the spark gap changes depending whether the center electrode 3*a* is in the side of positive or negative polarity. The results suggest that when the center electrode 3*a* is in the side of negative polarity, the spark gap increases less than did when the center electrode 3*a* is in the side of positive polarity. This holds true regardless of how many outer electrodes the multi-electrode type spark plug has. The results, however, further show that the multi-electrode type spark plug is advantageous compared to the single-electrode type spark plug in controlling the spark erosion of the electrodes.

Figure 12:
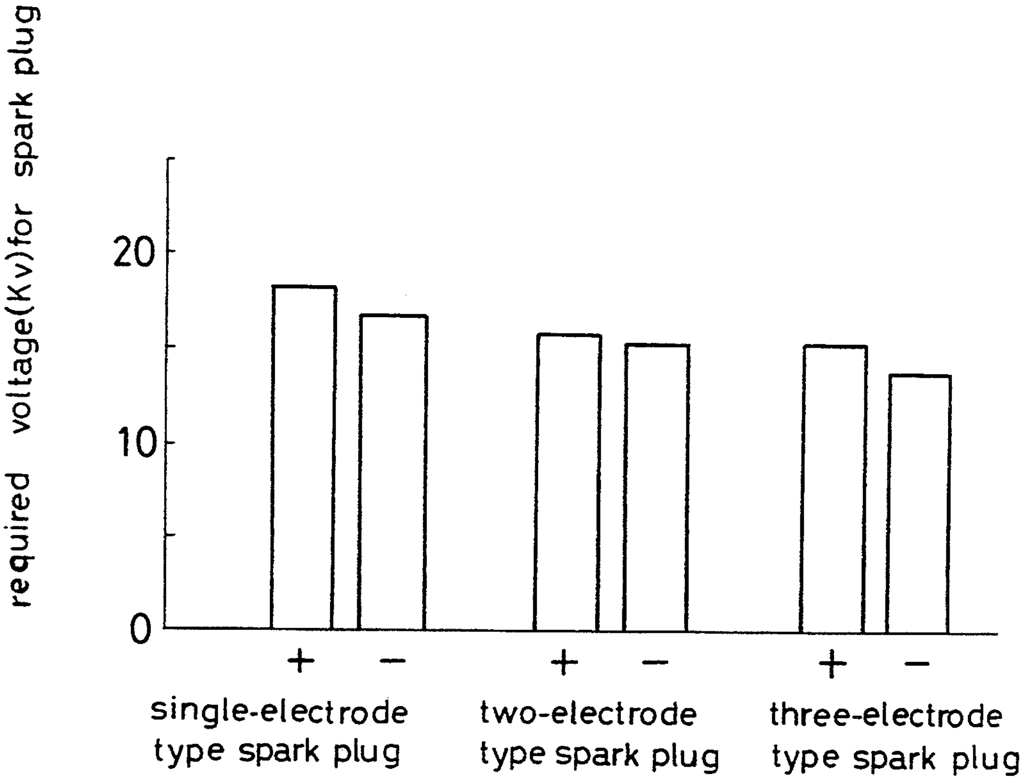
FIG. 12 is a graph showing a relationship between the number of the electrodes and a required voltage for the spark plug.

FIG. 12 shows a relationship how the required voltage (kv) for the spark plug changes depending whether the center electrode 3*a* is in the side of positive or negative polarity. It is found that the required voltage decreases with the increased number of the outer electrodes even when the center electrode 3*a* is in the side of positive polarity.

Figure 13:
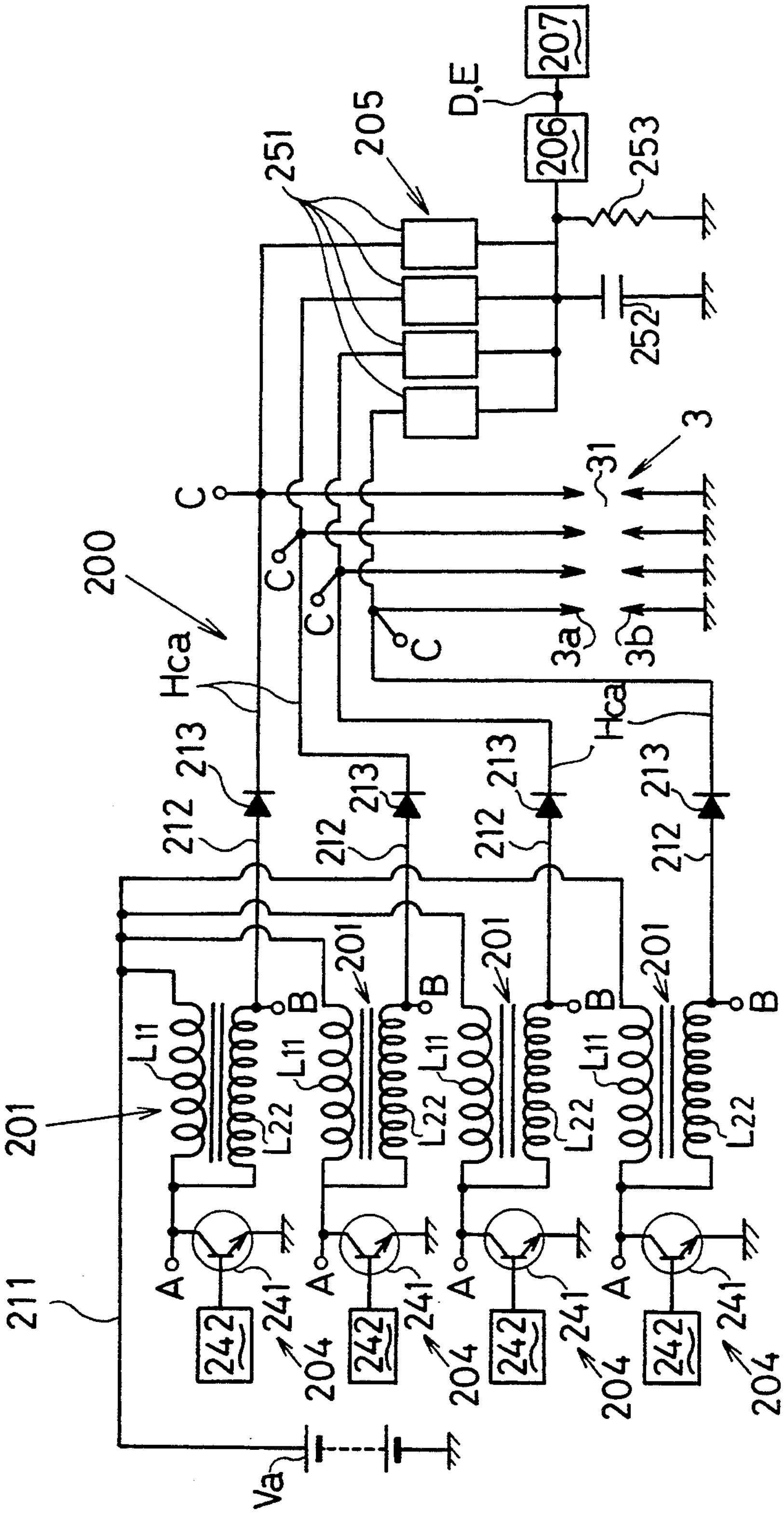
FIG. 13 is a schematic view of an ignition circuit in which an ignition detector is incorporated according to a third embodiment of the invention.

Referring to FIG. 13 which shows a distributorless type of an ignition detector 200 in which no distributor is needed, and incorporated into an internal combustion engine according to a third embodiment of the invention, the ignition detector 200 has an ignition circuit 201 which includes a primary circuit 211 and a secondary circuit 212 with a vehicular battery cell (Va) as a power source. The number of the ignition circuit 201 provided in the third embodiment corresponds to that of the cylinders of the internal combustion engine.

The primary circuit 211 has a primary coil (L11) electrically connected in series with a switching device 241 and a signal generator 242, while the secondary circuit 212 has a secondary coil (L22) and a check diode 213 connected in series with each other. A sparkplug cable (Hca) connects the diode 213 to the multi-electrode type spark plug 3 installed in each cylinder of the internal combustion engine. The spark plug 3 has the center electrodes 3*a* and the outer electrode 3*b* to form a spark gap 31 between the two electrodes 3*a*, 3*b*, across which spark occurs when energized. The multi-electrode type spark plug 3 has the same structure as mentioned in the first embodiment of the invention (see FIGS. 2 and 3).

The switching device 241 and the signal generator 242 forms an interrupter circuit 204 which detects a crank angle and a throttling degree of the engine to interrupt primary current flowing through the primary coil (L11) to induce a sparkplug voltage in the secondary coil (L22) of the secondary circuit 212 so that the timing of the spark corresponds to an advancement angle relevant to a revolution and load which the engine bears.

Meanwhile, an electrical conductor 251 surrounds an extension line of the sparkplug cable (Hca) to define static capacity of e.g. 1 pF therebetween so as to form a voltage divider circuit 205. The conductor 251 is connected to the ground by way of a condensor 252. To a common point between the conductor 251 and the condensor 252, is a sparkplug voltage detector circuit 206 electrically connected to which a distinction circuit 207 is connected. The condensor 252 has static capacity of e.g. 3000 pF to serve as a low impedance element, and the condensor 252 further has an electrical resistor 253 (e.g. 3 MΩ) connected in parallel therewith so as to form a discharge path for the condensor 252.

The voltage divider circuit 205 allows to divide the sparkplug voltage induced from the secondary circuit 212 by the order of 1/3000, which makes it possible to determine the time constant of RC path to be approximately 9 milliseconds to render an attenuation time length relatively longer (2∼3 milliseconds) as described hereinafter.

Figure 14:
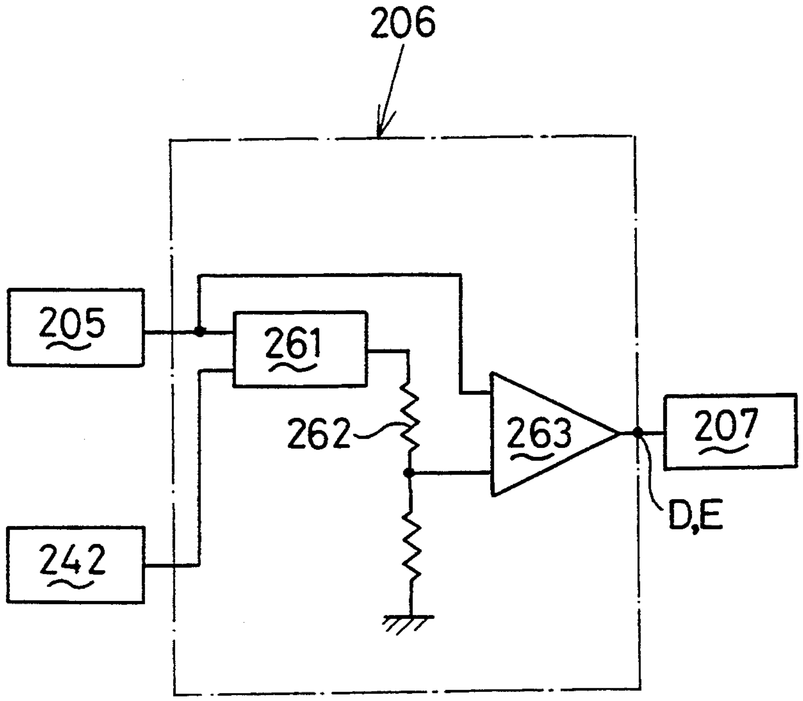
FIG. 14 shows a wiring diagram of a sparkplug voltage detector circuit according to the third embodiment of the invention.

In this instance, the sparkplug voltage 30000 V divided to a level of 10 V is inputted to the sparkplug voltage detector circuit 206. As shown in FIG. 14, the sparkplug voltage detector circuit 206 has a peak hold circuit 261 which is adapted to be reset at the time determined by the signal generator 242 in order to hold an output voltage generated from the voltage divider circuit 205. The spark voltage detector circuit 206 further has a divider circuit 262 which divides an output from the peak hold circuit 261, and having a comparator 263 which generates pulse signals by comparing an output from the divider circuit 262 with that of the voltage divider circuit 205.

Into the distinction circuit 207, is a microcomputer incorporated which compares output pulse singals with data previously determined by calculation and experiment so as to determine whether or not the misfire occurs in the cylinder of the internal combustion engine.

Figure 15:
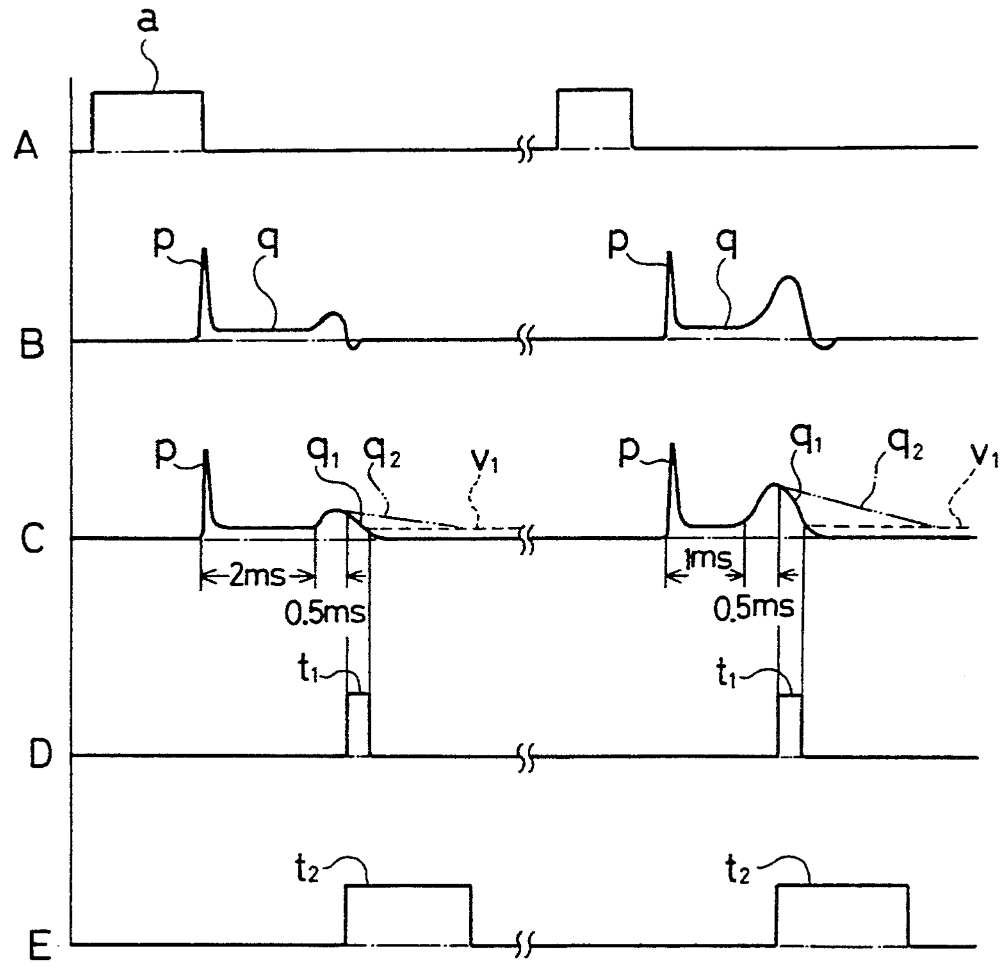
FIG. 15 is a view of a sparkplug voltage waveform shown for the purpose of explaining how the sparkplug voltage detector circuit works according to the third embodiment of the invention.

With the structure thus far described, the signal generator 242 on-off actuates the switching device 241 to output pulse signals (a) as shown at (A) in FIG. 15 in order to induce a secondary voltage in the secondary coil L22 as shown at (B) in FIG. 15 in which a termination of the pulse signals (a) accompanies a high voltage waveform (p) to initiate the spark occurring across the electrodes 3*a*, 3*b*, and accompanying a low inductive discharge (q) following the high voltage waveform (p).

Upon running the engine at a low revolution, the low inductive discharge (q) which forms a sparkplug voltage waveform sustains for approximately 2 ms, and disappears with an exhaustion of an electrical energy stored in the ignition circuit 201. The exhaustion of the electrical energy culminates the sparkplug voltage in 2∼3 kv. Upon running the engine at a high revolution, the low inductive discharge (q) which forms the sparkplug voltage waveform sustains for approximately 1 ms, and disappears with the exhaustion of the electrical energy stored in the ignition circuit 201. The exhaustion of the electrical energy culminates the sparkplug voltage in 5∼8 kv.

A sparkplug voltage waveform between the diode 213 and the spark plug 3 is derived in main from the discharge of the stray capacity (usually 10∼20 pF) inherent in the spark plug 3 after the spark terminates. An attenuation time length of the sparkplug voltage waveform differs between the case in which the spark normally ignites the air-fuel mixture gas and the case in which the spark fails to ignite the air-fuel mixture gas.

That is, the discharge from the stray capacity is released through ionized particles of the combustion gas upon carrying out the normal combustion, so that the sparkplug voltage waveform rapidly attenuates as shown at solid lines (q1) of (C) in FIG. 15. The misfire makes the unburned gas free from the ionized particles, so that the discharge from the stray capacity leaks mainly through the spark plug 3. The sparkplug voltage waveform slowly attenuates as shown at phantom lines (q2) of (C) in FIG. 15.

In the meanwhile, an average value of the spark sustaining time length is determined according to operating conditions obtained from calculation and experiment based on the revolution, the workload of the engine and the design of the ignition system. The signal generator 242 is adapted to carry out the reset and peak hold timing of the peak hold circuit 61 by approximately 0.5 ms later following the expiration of the average value of the spark sustaining time length.

The peak hold circuit 261 holds a charged voltage of the stray capacity inherent in the spark plug 3, while the divider circuit 262 divides the charged voltage. With ⅓ of the charged voltage as a reference voltage (vi), the comparator 263 compares the reference voltage (v1) with the output voltage waveform from the voltage divider circuit 205. The comparator 263 generates a shorter pulse (t1) as shown (D) in FIG. 15 when the spark normally ignites the air-fuel mixture gas, while generating a wider pulse (t2) as shown (E) in FIG. 15 when the misfire occurs.

The pulses (t1), (t2) are fed into the distinction circuit 207 so as to cause the circuit 207 to determine the misfire when the attenuation time length exceeds 3 ms upon running the engine at the low revolution (1000 rpm), while determining the misfire when the attenuation time length exceeds 1 ms upon running the engine at the high revolution (6000 rpm). The distinction circuit 207 further determines the misfire when the attenuation time length exceeds the one decreasing in proportion to the engine revolution which falls within an intermediate speed range between 1000 rpm and 6000 rpm.

Figure 16:
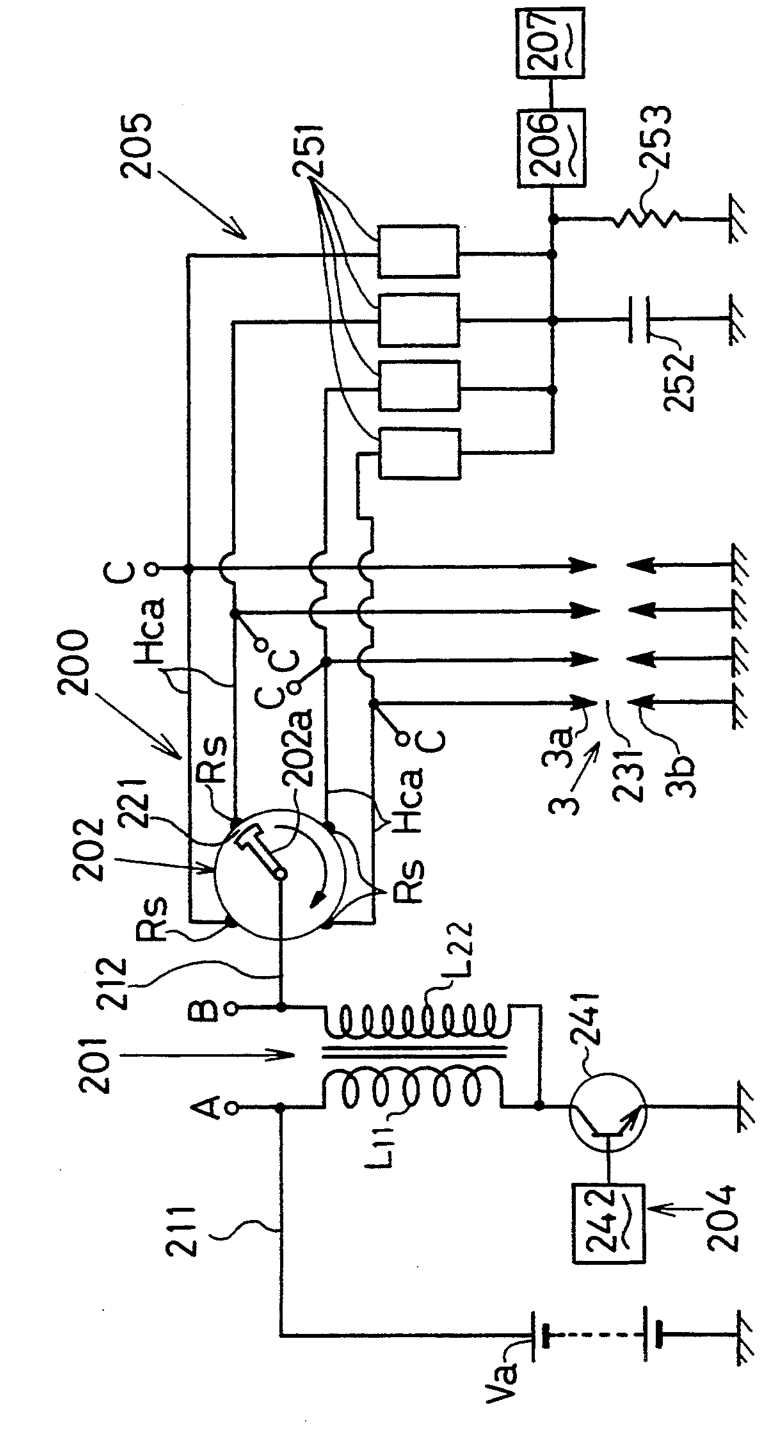
FIG. 16 is a view similar to FIG. 11 according to a fourth embodiment of the invention.

FIG. 16 shows a fourth embodiment of the invention in which like reference numerals in FIG. 16 are identical to those in FIG. 13. A main portion in which the fourth embodiment differs from the third embodiment is that a distributor 202 is provided according to the fourth embodiment of the invention.

In the fourth embodiment of the invention in which only a single ignition circuit is necessary as designated at numeral 201 as the same manner in FIG. 11, the secondary coil (L22) of the secondary circuit 212 is connected directly to a rotor 202*a* of the distributor 202. The distributor 202 has stationary segments (Rs), the number of which corresponds to that of the cylinders of the internal combustion engine. To each of the stationary segments (Rs), is an free end of the rotor 202*a* adapted to approaches so as to make a rotor gap 221 (series gap) with the corresponding segments (Rs). Each of the segments (Rs) is connected to the multi-electrode type spark plug 3 by way of the high tension cord (Hca). The multi-electrode type spark plug 3 has the center electrode 3*a* and the outer electrode 3*b* to form the spark gap 31 between the two electrodes 3*a*, 3*b*, across which spark occurs when energized. The multi-electrode type spark plug 3 has the same structure as described at the first embodiment of the invention shown in FIGS. 2 and 3.

The interrupter circuit 204 which is formed by the switching device 241 and the signal generator 242 serves as a voltage charging circuit according to the fourth embodiment of the invention.

Upon running the engine at a relatively low revolution less than 3000 rpm, the enhanced level of the spark-plug voltage is such a degree as to limit the voltage level charged in the stray capacity of the spark plug 3 by way of the series gap 221 after the spark terminates, thus rendering it impossible to precisely determine the attenuation characterics of the sparkplug voltage. In this instance, it is advantageous to independently induce an increased level of the secondary voltage based on the voltage charging circuit.

The voltage charging circuit is adapted to selectively on-off actuates the primary coil (L11) so as to induce a charging voltage in the secondary circuit 12 either during establishing the spark between the electrodes 3*a*, 3*b* or during a predetermined time period immediately after an end of the spark, thus leading to electrically charging the stray capacity inherent in the spark plug 3.

The voltage charging circuit is actuated only upon running the engine at a relatively low revolution of less than 3000 rpm. Upon running the engine at the high revolution exceeding 3000 rpm, it is needless to activate the voltage charging circuit since the secondary voltage is excited to reach 5~8 kv enough to positively break down the series gap 221. A range which the voltage charging circuit is actuated is appropriately determined depending on a type of the internal combustion engine, and adjusted by operating conditions such as the load of the engine, temperature of cooling water and the vehicular battery cell (Va).

Figure 17:
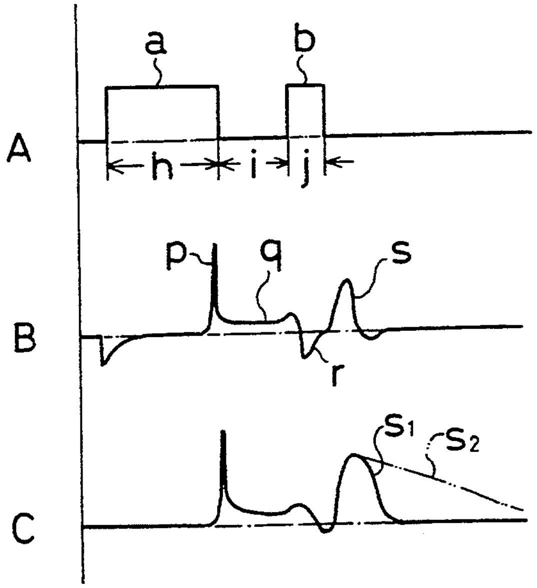
FIG. 17 is a schematic view of a sparkplug voltage waveform shown for the purpose of explaining how the sparkplug voltage detector circuit works according to the fourth embodiment of the invention.

The ignition detector 200 is operated in the same manner as described in the third embodiment of the invention, upon running the engine at the high revolution exceeding 3000 rpm. Upon running the engine at the relatively low revolution of less than 3000 rpm, the ignition detector 200 is operated as follows:

The signal generator 242 of the interrupter circuit 204 outputs pulse signals in order to induce the primary current in the primary circuit 211 as shown at (A) in FIG. 17. Among the pulse signals, the pulse (a) which has a larger width (h) energizes the multi-electrode type spark plug 3 to establish the spark between the electrodes 3*a*, 3*b*.

The pulse (a) followed by the pulses (b) delays by the time (i) of 1.5~2.5 ms. The pulse (b) has a small width (j) to electrically charge the stray capacity inherent in the multi-electrode type spark plug 3.

In so doing, the time length during which the free end of the rotor 202*a* forms the rotor gap 221 with each of the segments (Rs), changes depending on the revolution of the engine. The pulse width (h) and the delay time (i) are preferably determined relatively shorter (1.5 ms) in a manner that the spark sustains for 0.5~0.7 ms when the engine is running within a range of the intermediate revolution.

with the actuation of the interrupter circuit 204, the spark plug voltage appears in the secondary coil (L22) of the secondary circuit 212 as shown at (C) in FIG. 17. Due to the high voltage (p) established following the termination of the pulse signal (a), the spark discharge begins to occur across the electrodes 3*a*, 3*b*, and accompanying an inductive discharge waveform (q) until the spark terminates.

In response to the rise-up pulse signal (b), a counter-electromotive voltage accompanies a positive voltage waveform (r) flowing through the secondary circuit 212. Due to an electrical energy stored in the ignition circuit 201 when the primary coil (L11) is energized, the spark plug voltage is enhanced again to draw a voltage waveform (s) through the secondary circuit 212 when the primary coil (L11) is deenergized. The enhanced voltage level is determined as desired by the delay time (i) and the width (j) of the pulse signal (b). The level of the voltage waveform (s) is determined to be 5~7 kv, the intensity of which is enough to break down the rotor gap 221, but not enough to establish a discharge across the electrodes 3*a*, 3*b* when substantially no ionized particles stay in the spark gap 31.

The discharge voltage in main from the stray capacity (usually 10~20 pF) inherent in the spark plug 3, is released as shown at (C) in FIG. 17. The attenuation time length of the discharge voltage distinguishes the case in which the spark normally ignites the air-fuel mixture gas from the case in which the spark fails to ignite the air-fuel mixture gas injected in each cylinder of the internal combustion engine. That is to say, the misfire follows a slowly attenuating waveform (s2) of (C) as shown in FIG. 17, while the normal combustion follows an abruptly attenuating waveform (s1) of (C) as shown in FIG. 17.

Whether or not the misfire occurs is determined by detecting the attenuation time length required for the peak voltage level to drop as described in the third embodiment of the invention shown in FIG. 14.

It is noted that a check diode may be electrically connected between the rotor 202*a* of the distributor 202 and the secondary coil (L22) of the secondary circuit 212. The check diode allows electric current to flow from the secondary coil (L22) to the rotor 202*a* of the distributor 202, but prohibits the electric current to flow backward. The check diode prevents an excessively charged voltage 5~7 kv from inadvertently flowing backward to the ignition circuit 201 by way of the series gap 221. This enables to avoid an abrupt rise-up voltage in the ignition circuit so as to contribute to a precise misfire detection.

The misfire is thus far detected on the basis of the attenuation time length by holding the sparkplug voltage at the predetermined time, it is however noted that the misfire may be determined by detecting the sparkplug voltage level changed after the elapse of the predetermined time.

Figure 18:
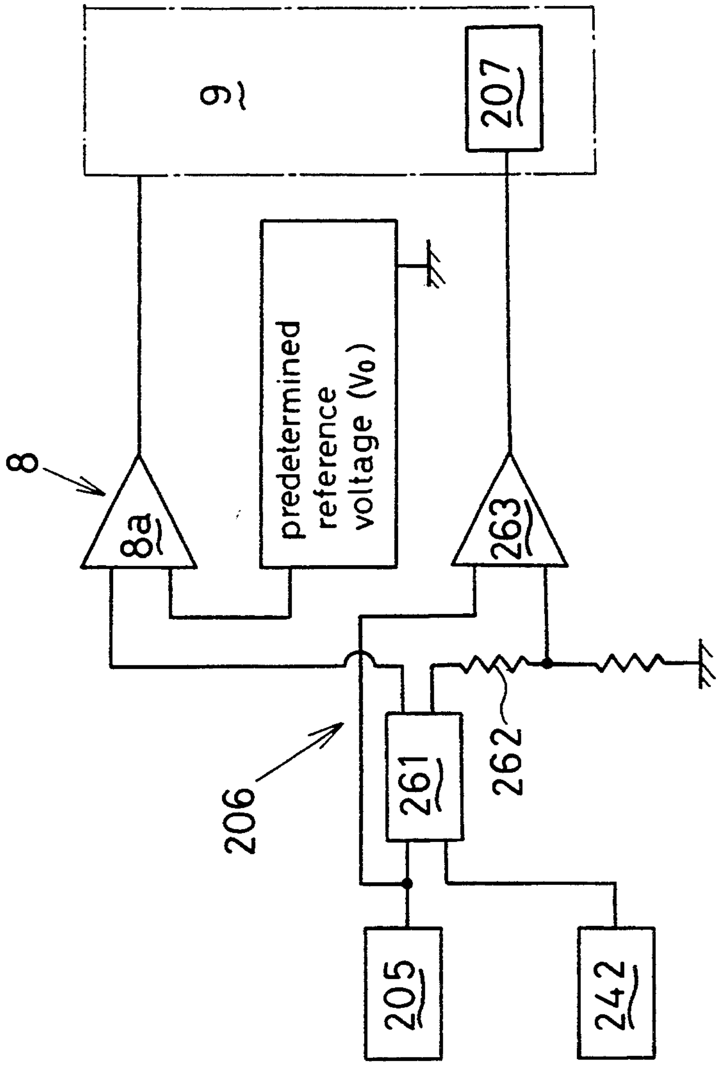
FIG. 18 shows a wiring diagram of a sparkplug voltage detector circuit according to the fourth embodiment of the invention.

FIG. 18 shows a fifth embodiment of the invention in which like reference numerals in FIG. 18 are identical to those in FIG. 14. Numeral 8 designates a step-up level detector circuit which detects a stepped-up level of the sparkplug voltage after the end of the spark action. The step-up level detector circuit 8 has a comparator 8a to compare a predetermined reference voltage (Vo) with a peak voltage value held by the peak hold circuit 261 so as to generate output pulses. The output pulses are fed into an auxiliary distinction circuit 9 which determines the misfire depending on the level of the output pulses.

Figure 19:
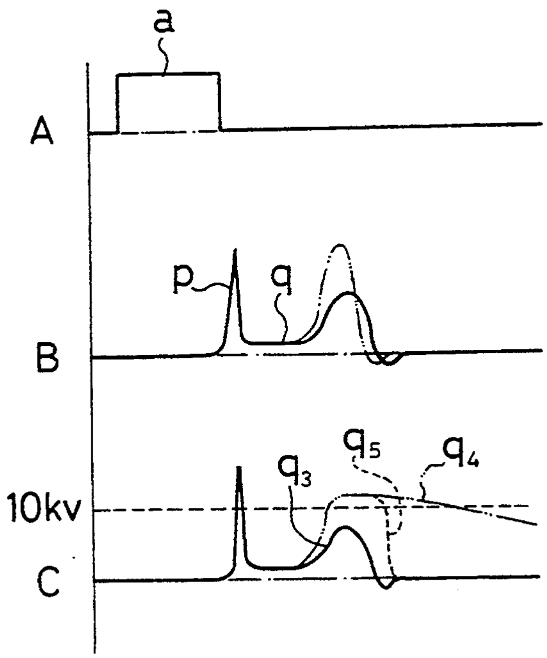
FIG. 19 is a view of a voltage waveform shown for the purpose of explaining how the sparkplug voltage detector circuit works according to the fourth embodiment of the invention.

FIG. 19 shows a waveform of the sparkplug voltage upon running the engine at full revolution (5000 rpm) with a high load. An enhanced voltage level of the sparkplug voltage is only 3∼5 kv as shown at (q3) of (C) in FIG. 19 when the spark normally ignites the air-fuel mixture gas. The sparkplug voltage may rise to 10 kv or more as shown at (q4) of (C) in FIG. 19 when the spark fails to ignite the air-fuel mixture gas. The subsequent spark causes to abruptly descend the rise-up sparkplug voltage as shown at (q5) of (C) in FIG. 19. The abruptly descended waveform (q5) makes it difficult to distinguish the attenuation characteristics of the normal combustion from that of the misfire.

As opposed against this instance, it is possible to positively distinguish the normal combustion from the misfire upon running the engine at the high revolution by directly detecting the enhanced level of the sparkplug voltage to decide whether or not the enhanced level exceeds the predetermined reference voltage (Vo: e.g. 10 kv).

According to the third through fifth embodiments of the invention, the same results are obtained as represented by FIG. 8 through FIG. 12 of the first and second embodiments of the invention.

While the invention has been described with reference to the specific embodiments, it is understood that this description is not to be construed in a limiting sense in as much as various modifications and additions to the specific embodiments may be made by skilled artisan without departing from the spirit and scope of the invention.

What is claimed is:

1. A misfire detector device for use in an internal combustion engine comprising:

an ignition coil including a primary coil and a secondary coil;

an electrical interrupter circuit which on-off actuates a primary current flowing through a primary circuit of the ignition coil to induce a sparkplug voltage;

means provided in a secondary circuit of the ignition coil for preventing a current flowing back to the ignition coil;

a multi-electrode type spark plug which is to be energized from the ignition coil;

a voltage charging circuit which re-energizes the primary coil to induce an electromotive voltage in the secondary coil so as to electrically charge a stray capacity inherent in the spark plug at a time predetermined after the end of the spark action of the spark plug;

a voltage divider circuit which detects a divided voltage of the sparkplug voltage applied across electrodes of the spark plug;

a sparkplug voltage detector circuit which detects an attenuation time period length of an attenuation characteristic of a sparkplug voltage waveform presented subsequent to a time period predetermined after an end of a spark action of the spark plug; and a distinction circuit which determines on the basis of the attenuation time period length of the attenuation characteristic whether or not the spark ignites an air-fuel mixture injected in a cylinder of an internal combustion engine.

2. A misfire detector device for use in an internal combustion engine comprising:

an ignition coil including a primary coil and a second coil;

an electrical interrupter circuit which on-off actuates a primary current flowing through a primary circuit of the ignition coil to induce a sparkplug voltage;

means provided in a secondary circuit of the ignition coil for preventing a current flowing back to the ignition coil;

a multi-electrode type spark plug which is to be energized from the ignition coil;

a voltage divider circuit which detects a divided voltage of the sparkplug voltage applied across electrode of the spark plug;

a sparkplug voltage detector circuit which detects an attenuation time period length of an attenuation characteristic of a sparkplug voltage waveform presented subsequent to a time period predetermined after an end of a spark action of the spark plug; and a distinction circuit which determines on the basis of the attenuation time period length of the attenuation characteristic whether or not the spark ignites an air-fuel mixture injected in a cylinder of an internal combustion engine.

3. A misfire detector device for use in an internal combustion engine comprising:

an ignition coil including a primary coil and a secondary coil;

an interrupter circuit which on-off actuates a primary current flowing through a primary circuit of the ignition coil to induce a sparkplug voltage;

means provided in a secondary circuit of the ignition coil for preventing a current flowing back to the ignition coil;

a multi-electrode type spark plug which is to be energized from the ignition coil;

a voltage charging circuit which induces a sparkplug voltage in the secondary circuit of the ignition coil so as to electrically charge a stray capacity inherent in the spark plug at a time predetermined after an end of a spark action of the spark plug when the engine runs at a low revolution with a low load;

a voltage divider circuit which detects a divided voltage of the sparkplug voltage applied across electrodes of the spark plug;

a sparkplug voltage detector circuit which detects an attenuation characteristic of a divided sparkplug voltage waveform presented subsequent to a time period predetermined after an end of the spark action when the engine runs at a high revolution, and detecting an attenuation characteristic of a divided sparkplug voltage waveform derived from the voltage charging circuit when the engine runs at a low revolution with a low load; and a distinction circuit which determines on the basis of the attenuation characteristic whether or not the spark ignites an air-fuel mixture injected in a cylinder of an internal combustion engine.

4. A misfire detector device for use in an internal combustion engine as recited in any one of claims 1, 2 or 3, wherein a peak hold circuit is provided to hold a peak voltage of the sparkplug voltage waveform presented after the end of the spark action of the spark plug, so that the distinction circuit detects a misfire on the basis of a peak voltage level or the attenuation characteristic of the sparkplug voltage waveform.

5. A misfire detector device for use in an internal combustion engine as recited in in any one of claims 1, 2 or 3, wherein the multi-electrode type spark plug has a center electrode, a front end of which is circumferentially coated by a precious metal-based layer, and a front end and its end surface of an outer electrode is also coated by the precious metal-based layer.

6. A misfire detector device for use in an internal combustion engine as recited in any one of claims 1, 2, 3, wherein said means for preventing a current flowing back to said ignition coil comprises a series gap.

7. A misfire detector device for use in an internal combustion engine as recited in any one of claims 1, 2, 3, wherein said means for preventing a current flowing back to said ignition coil comprises a check diode.

* * * * *